United States Patent
Sjöberg et al.

(10) Patent No.: US 12,132,826 B2
(45) Date of Patent: Oct. 29, 2024

(54) POLICY-AWARE DISTRIBUTED LEDGER NETWORKS

(71) Applicant: Telefonaktiebolaget LM Ericsson (publ), Stockholm (SE)

(72) Inventors: Johan Sjöberg, Stockholm (SE); Rémi Robert, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 263 days.

(21) Appl. No.: 17/995,927

(22) PCT Filed: Apr. 15, 2020

(86) PCT No.: PCT/SE2020/050386
§ 371 (c)(1),
(2) Date: Oct. 11, 2022

(87) PCT Pub. No.: WO2021/211025
PCT Pub. Date: Oct. 21, 2021

(65) Prior Publication Data
US 2023/0198747 A1 Jun. 22, 2023

(51) Int. Cl.
*H04L 9/08* (2006.01)
*G06F 21/62* (2013.01)
(Continued)

(52) U.S. Cl.
CPC .............. *H04L 9/083* (2013.01); *H04L 9/50* (2022.05)

(58) Field of Classification Search
CPC ......... H04L 9/083; H04L 9/50; H04L 9/3268; H04L 9/3239; H04L 63/102;
(Continued)

(56) References Cited

U.S. PATENT DOCUMENTS

| 2004/0225600 | A1 | 11/2004 | Onodera et al. |
| 2018/0349621 | A1 | 12/2018 | Schvey et al. |

(Continued)

FOREIGN PATENT DOCUMENTS

| CN | 110717203 A | 1/2020 |
| CN | 110717764 A | 1/2020 |
| WO | 2021/057180 A1 | 4/2021 |

OTHER PUBLICATIONS

Communication under Rule 71(3) EPC, EP App. No. 20930831.1, May 31, 2024, 8 pages.
(Continued)

*Primary Examiner* — Vu V Tran
(74) *Attorney, Agent, or Firm* — Nicholson De Vos Webster & Elliott LLP

(57) ABSTRACT

A method and a DL node for processing a transaction in a distributed ledger (DL) network based on policies are described. A request for a transaction including data is received at a DL node from a user device. A first set of one or more DL nodes of the DL network that have characteristics that satisfy one or more policies associated with the data of the transaction are determined. In response to determining that the DL node is one of the set of DL nodes, the transaction is executed at the DL node, and the transaction is inserted as a private transaction in a digital ledger of the DL network causing a second set of one or more DL nodes of the DL network that is different from the first set of DL nodes to access only an identifier of the transaction and not a payload of the transaction.

18 Claims, 10 Drawing Sheets

(51) Int. Cl.
　　　*G06Q 20/06*　　　(2012.01)
　　　*G06Q 20/38*　　　(2012.01)
　　　*G06Q 20/40*　　　(2012.01)
　　　*H04L 9/00*　　　(2022.01)
　　　*H04L 9/32*　　　(2006.01)
　　　*H04L 9/40*　　　(2022.01)

(58) Field of Classification Search
　　　CPC .............. G06F 21/6218; G06Q 20/065; G06Q 20/3829; G06Q 20/383; G06Q 20/389; G06Q 20/405
　　　See application file for complete search history.

(56) References Cited

U.S. PATENT DOCUMENTS

| | | |
|---|---|---|
| 2019/0057454 A1 | 2/2019 | Komenda et al. |
| 2019/0190696 A1 | 6/2019 | Singh |
| 2019/0355057 A1* | 11/2019 | Phillips .................. G06Q 40/03 |
| 2020/0007312 A1 | 1/2020 | Vouk et al. |
| 2020/0007313 A1* | 1/2020 | Vouk ...................... H04L 63/12 |
| 2021/0067339 A1* | 3/2021 | Schiatti .................. G06F 16/27 |
| 2023/0421395 A1* | 12/2023 | Viswanath ............. G06F 16/27 |

OTHER PUBLICATIONS

International Search Report and Written Opinion, Application No. PCT/SE2020/050386, Feb. 15, 2021, 12 pages.
"Distributed Ledger Technology: beyond block chain," 2016, 88 pages, Government Office for Science.
International Preliminary Report on Patentability, Application No. PCT/SE2020/050386, Oct. 27, 2022, 9 pages.
Supplementary European Search Report and Search Opinion, EP App. No. 20930831.1, May 15, 2023, 6 pages.

* cited by examiner

POLICY-AWARE DISTRIBUTED LEDGER NETWORKS

CROSS-REFERENCE TO RELATED APPLICATIONS

This application is a National stage of International Application No. PCT/SE2020/050386, filed Apr. 15, 2020, which is hereby incorporated by reference.

TECHNICAL FIELD

The present disclosure relates to the field of distributed ledger technology networks; and more specifically, to enabling policy-aware distributed ledger networks.

BACKGROUND

Distributed ledger technology (DL) networks are platforms used for building, running, and deploying a decentralized, distributed and public distributed digital ledger. In a DL network a digital ledger permanently records digital records of transactions that occur between two participants. The records cannot be altered retroactively without the alteration of all subsequent transactions in the digital ledger and without consensus from multiple nodes in the DL technology network. Recordation of transactions in the digital ledger allows the participants to verify and audit transactions inexpensively and securely. A digital ledger is maintained without a central authority or implementation. In a DL technology network the data can be spread across multiple organizations, potentially in different countries, under different legislations, with different level of technical expertise.

DL networks may be public (which can also be referred to as permissionless) or private (which can also be referred to as permissioned). Public DL networks are available to anyone who wants to join and use the network. In this type of DL network, anyone is allowed to read, write, or join the public DL network. In public DL networks, anyone, anywhere, can use the DL network to input transactions and data. In contrast, while private DL networks can be similar to public DL networks in certain aspects, they have access controls that restrict those that can join the network. Private DL networks have one or multiple entities that control the network.

Today data legislations (such as General Data Protection regulation (GDPR)), country legislation, or company policies are examples of rules that need to be followed when handling user data. These rules impose restrictions on how the data can be handled (where it is allowed to be stored, for how long, by whom . . . ). Existing DL networks do not support the handling of data according to rules associated with this data resulting in the data being handled in violation of such legislations and/or policies.

SUMMARY

The embodiments described herein present a solution for enabling distributed ledger networks to handle policy regulated data. The solution integrates to the DL network infrastructure the ability to store and validate characteristics of DL nodes (i.e., geolocation, certifications, software versions, redundancy, etc.). The solution advantageously integrates the notion of data policies to the infrastructure of the DL network, providing data owners the guarantee that their data is handled according to these policies.

One general aspect includes a method of processing a transaction in a distributed ledger (DL) network, the method including: receiving, at a DL node from a user device, a request for a transaction including data; determining a first set of one or more DL nodes of the DL network that have characteristics that satisfy one or more policies associated with the data of the transaction; responsive to determining that the DL node is one of the set of DL nodes, performing the following: executing the transaction at the DL node; and inserting the transaction as a private transaction in a digital ledger of the DL network causing a second set of one or more DL nodes of the DL network that is different from the first set of DL nodes to access only an identifier of the transaction and not a payload of the transaction.

A computer program comprising instructions which, when executed on at least one processor, cause the at least one processor to carry out a method of processing a transaction in a distributed ledger (DL) network. The method including: receiving, at a DL node from a user device, a request for a transaction including data; determining a first set of one or more DL nodes of the DL network that have characteristics that satisfy one or more policies associated with the data of the transaction; responsive to determining that the DL node is one of the set of DL nodes, performing the following: executing the transaction at the DL node; and inserting the transaction as a private transaction in a digital ledger of the DL network causing a second set of one or more DL nodes of the DL network that is different from the first set of DL nodes to access only an identifier of the transaction and not a payload of the transaction.

One general aspect includes a node in a distributed ledger network, the node including: one or more processors; and a computer readable storage medium storing instructions which when executed by the one or more processors cause the node to perform operations including: receiving, at a DL node from a user device, a request for a transaction including data; determining a first set of one or more DL nodes of the DL network that have characteristics that satisfy one or more policies associated with the data of the transaction; responsive to determining that the DL node is one of the set of DL nodes, performing the following: executing the transaction at the DL node; and inserting the transaction as a private transaction in a digital ledger of the DL network causing a second set of one or more DL nodes of the DL network that is different from the first set of DL nodes to access only an identifier of the transaction and not a payload of the transaction.

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

Figure 1A:
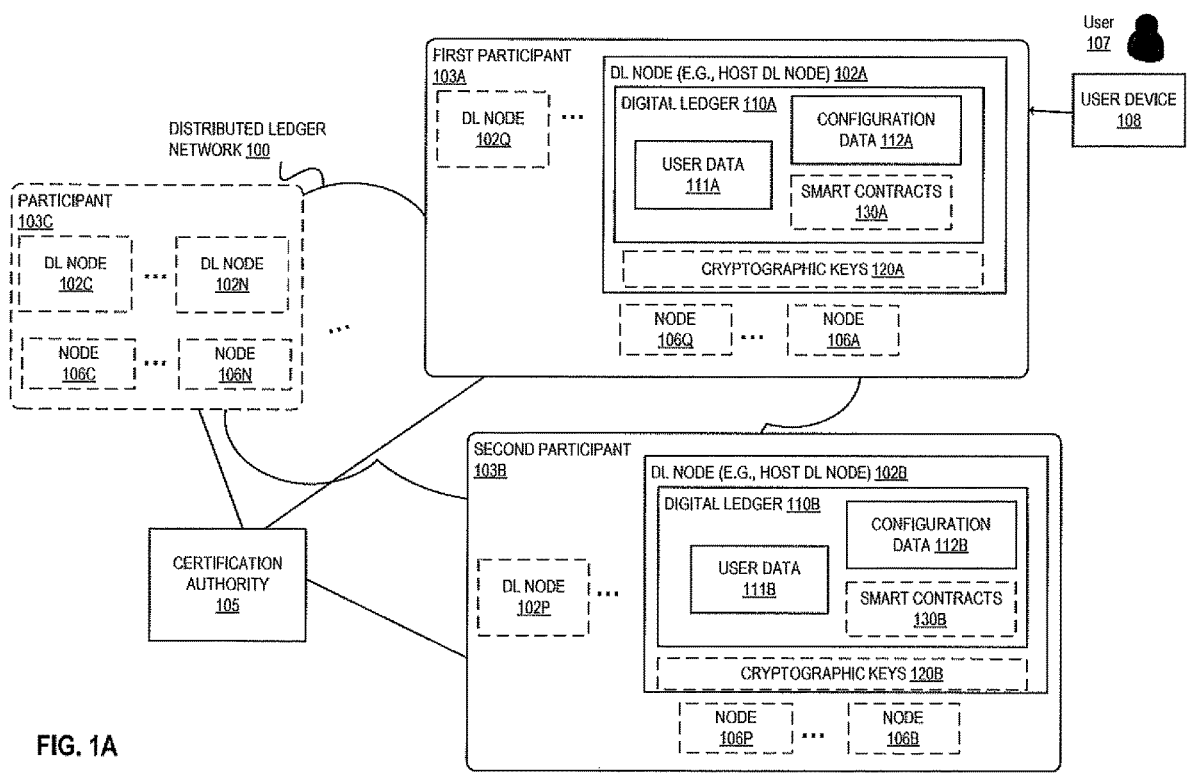
FIG. 1A illustrates a block diagram of an exemplary DL network that is operative to handle policy regulated data, in accordance with some embodiments.

The following description describes methods and apparatus for processing transactions in a distributed ledger network according to policies associated with data and characteristics of distributed ledger nodes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the embodiments may be practiced without such specific details. In other instances, control structures, gate level circuits and full software instruction sequences have not been shown in detail in order not to obscure the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to some embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Data legislations (such as General Data Protection regulation (GDPR)), country legislation, or company policies might impose restrictions to how the data can be handled (where it is allowed to be stored, for how long, by whom . . . ). In the following description data policies will refer to national, regional, and/or international legislations, regulations and/or standards, which may be determined by a national or international authority (such as a government, an international governing body or organization, etc.), and/or to organization or company rules or policies. In the case of storage of the data in DL networks, conforming to data policies is challenging. In fact, replication of data to multiple DL nodes is a requirement of DL network. However, the DL nodes of a DL network are spread across multiple organizations and the multiple DL nodes may be located in different geographical locations under varying jurisdiction. Existing DL networks do not include information regarding the characteristics of a DL node, its geographical location or software configuration for instance, and thus the data is disseminated indiscriminately to the multiple DL nodes. As a result, even though existing DL networks allow administrators to define the recipients of private transactions at the ledger level, they provide no guarantee regarding specificities of the storage of the data by the DL nodes of the recipient, for instance their geographical location or their conformance to a standard, policy, or regulation. Another consequence of the architecture of existing DL networks, is that they do not include the tools needed to allow the participants to describe the policies that govern the handling of the data inserted in the digital ledger. Further, the existing DL networks also lack the possibility to describe how execution of smart contracts can affect and/or transform these policies.

In private DL networks, several features have been developed to allow to expose data to only a subset of the participants in the DL networks. In some DL networks, it is possible to disclose a private transaction to only some of the participants in the network. The disclosure of the private transaction to some of the participants can be achieved as follows: instead of broadcasting the transaction to all participants, the transaction is only sent to a subset of the participants that will be tasked with executing the transaction. Moreover, the transaction payload is not stored in the DL datastore, instead only an identifier of the transaction is recorded in the DL datastore, and the actual payload of the transaction is maintained by a transaction manager for each participant. The identifier can be used to authenticate the payload of the transaction.

The embodiments described herein address the shortcomings and disadvantages of existing DL network. The embodiments herein present systems and methods of a DL network that ensure the proper handling of data according to the policies and regulations applicable to the different types of data. As it will be described in further detail below, during a setup phase of the DL network, the participants define and agree on data regulations and policies that govern the data handled in the DL network and the characteristics of DL nodes. This allows the participants of the DL network to have a common view on which peers satisfy the requirements of which regulations and policies. Additionally, the peers can also periodically perform independent measurements so as to validate the characteristics advertised by others and store the result in the ledger. Further, the embodiments described herein allow a DL node receiving a transaction to identify the policies that apply to the data submitted in the transaction. For example, the DL node is operative to identify the policies that apply to inputs and outputs of smart contracts. This allows the full transaction to be disseminated only to suitable DL nodes, which eventually ensure that the data is handled in accordance with the associated policies.

The embodiments described herein present several advantages when compared with existing DL networks. The embodiments herein integrate to the DL network infrastructure mechanisms to store and validate characteristics of DL nodes (i.e., geolocation, certifications, software versions, redundancy, etc.). They further integrate the notion of data policies to the infrastructure of the DL network, providing data owners the guarantee that their data is handled according to these policies. They also enable the integration of the notion of data policies in the smart contract logic, allowing to automatically handle changes in policies caused by the processing of the data by smart contracts.

Overview

FIG. 1A illustrates a block diagram of an exemplary DL network that is operative to handle policy regulated data, in accordance with some embodiments. In the following description some examples will be described for a particular type of DL networks, namely DL networks that support smart contracts. However, the embodiments described herein generally apply to other types of DL networks, which do not necessarily need to implement and support smart contracts.

The DL network 100 includes a set of DL nodes 102A-N. The DL network further includes a certification authority 105. The various nodes and the certificate authority communicate through a physical network (wired, wireless, or a combination of wired and wireless networking technology) that is not illustrated. The DL network 100 is a private distributed ledger that is operative to enable participants in the network to have access to private data while other participants in the network cannot access this private data. In some embodiments, the DL network 100 is operative to enable participants to have access to public data that all participants can view. In some embodiments, the DL network 100 is a blockchain network. In one embodiment, the DL nodes 102A-N, may be permissioned to join the DL network 100 via, for example, an access control list. In some embodiments, the access control list can be managed by smart contract.

A participant in the DL network 100 is an entity that can participate and contribute to transactions with other participants in the ledger. The participant can be a person, an organization, a program run on a processor, etc. The participant is associated with a node that is used to access the DL network 100. The node of the participant can be a DL node, e.g., DL node 102A or DL node 102Q, or a simple node, e.g., nodes 106A-Q, that is not part of the DL network 100. In a non-limiting example, the DL network 100 includes multiple participants 103A-C. The first participant 103A owns and/or operate one or more DL nodes 102A-Q. Optionally, the first participant can own and/or operate one or more other nodes, e.g., one or more of the nodes 106A-Q that enable users associated with the participant 103A to access the distributed ledger (DL) network 100. The second participant 103B owns and/or operate one or more DL nodes 102B-P. Optionally, the second participant can own and/or operate one or more other nodes, e.g., one or more of the nodes 106B-P that enable users associated with the participant 103B to access the DL network 100. The first participant 103A owns and/or operate one or more DL nodes 102A-Q. In some embodiments, the DL network 100 may further include additional participants and nodes, e.g., participant 103C. Participant 103C owns and/or operate one or more DL nodes 102C-N. The participant 103C can own and/or operate one or more other nodes, e.g., one or more of the nodes 106C-N that enable users associated with the participant 103C to access the DL network 100. While the DL network 100 is illustrated as including 3 participants, each associated with a given number of DL nodes and/or simple nodes, this is intended to be exemplary only, and different numbers of participants can be part of the DL network 100 with different numbers of DL nodes or nodes.

A DL node is a node that is operative to perform some, or all operations related to updating and maintaining the digital ledger. For example, a DL node can be a full node that stores the entire digital ledger. Alternatively, the DL node can be a light node, which may include only a partial list of the digital ledger. The DL node may further be operative to receive transactions from nodes of participants, evaluate the transactions, and validates them to be added to the digital ledger based on a consensus algorithm (such as Proof of Work (PoW), Proof of Stake (PoS), or other). Thus, the DL node is operative to synchronize the state of the digital ledger, as well as receive request from users to alter the state (receive, evaluate, and validate transactions). Additionally, the DL node may also be operative to asses some characteristics of the system hosting the DL node (for instance determine if any extra port is open, etc.).

In the following description the operations of the embodiments herein will be described with respect to the DL node 102A of the first participant 103A. However, this is intended to be exemplary only and the same operations can be performed by each one or a subset of the nodes of the DL network 100. A DL node includes a digital ledger 110A, optional smart contracts 130A, and optional cryptographic keys 120A. The DL node 102A is operative to store private data and public data. The private data can belong to the participant that owns the DL node or data that belongs to one or more participants different from the participant that owns the DL node. The DL node 102A may include additional elements that are not illustrated. For example, a DL node may include a DL network state(s), and a transaction manager.

The digital ledger 110A is a complete list of every single transaction that has occurred on the DL network 100. Once transactions are written to the digital ledger 110A, they cannot be modified; the record of transactions (i.e., the digital ledger 110A) is immutable. While the DL nodes 102A-B are illustrated as including digital ledgers 110A, 110B, typically each one of the DL nodes 102A-B includes an identical copy of the digital ledger. The digital ledger stored on each one of the DL nodes 102A-B includes the same data. In some embodiments, some of the nodes may be light DL nodes including a subset of the entire digital ledger for the DL network 100. Thus, one or more of the DL nodes may include a copy of all or a portion of the digital ledger 110A.

The digital ledger 110A includes two categories of data: user data 111A and configuration data 112A. Both categories of data are stored in the digital ledger 110A when consensus is reached through standard mechanisms of consensus in the DL network 100 (such as PoW, PoS, or other). The user data 111A includes the transactions of the users of the DL network 100. The configuration data 112A contains the configuration information for the DL network 100. The user data 111A and the configuration 112A are described in further detail with reference to FIG. 1B.

The digital ledger 110A further includes optional smart contracts 130A and cryptographic keys 120A. In some embodiments, the smart contracts 130A are not included in the DL node 110A as the DL network does not support smart contracts. In other embodiments, the smart contracts are stored in the DL node when the DL network 100 supports smart contracts. In some embodiments, the smart contracts 130A are stored as part of the digital ledger 110A. In other embodiments, the smart contracts 130A are stored independently of the digital ledger 110A. A smart contract is computer code that implements a computer protocol intended to digitally facilitate, verify, or enforce the negotiation or performance of a contract. A smart contract allows the execution of transactions between two parties without a third party. Once executed, the transactions of a smart contract are stored in the digital ledger 110A and are trackable and irreversible. The cryptographic keys 120A are a set of keys that can be used to encrypt the data and communicate with the other DL nodes of the DL network 100. The cryptographic keys are securely stored such that entities that are not authorized cannot access them.

The DL network 100 may further include a certification authority 105. The certification authority 105 is a logical entity that is trusted by the participants of the DL network 100. The certification authority 105 can be an organization separate and distinct from the participants 103A-C that are part of the DL network 100. In a non-limiting example, the certification authority can be an audit company. Alternatively, the certification authority 105 can be a participant of the DL network 100 that is trusted by the other participants of the DL network 100. In some embodiments, the certification authority 105 can be a consortium of the participants of the DL network 100. The certification authority 105 owns and operates electronic devices that are operative to certify characteristics of DL nodes in the DL network 100.

Data of the Digital Ledger

Figure 1B:
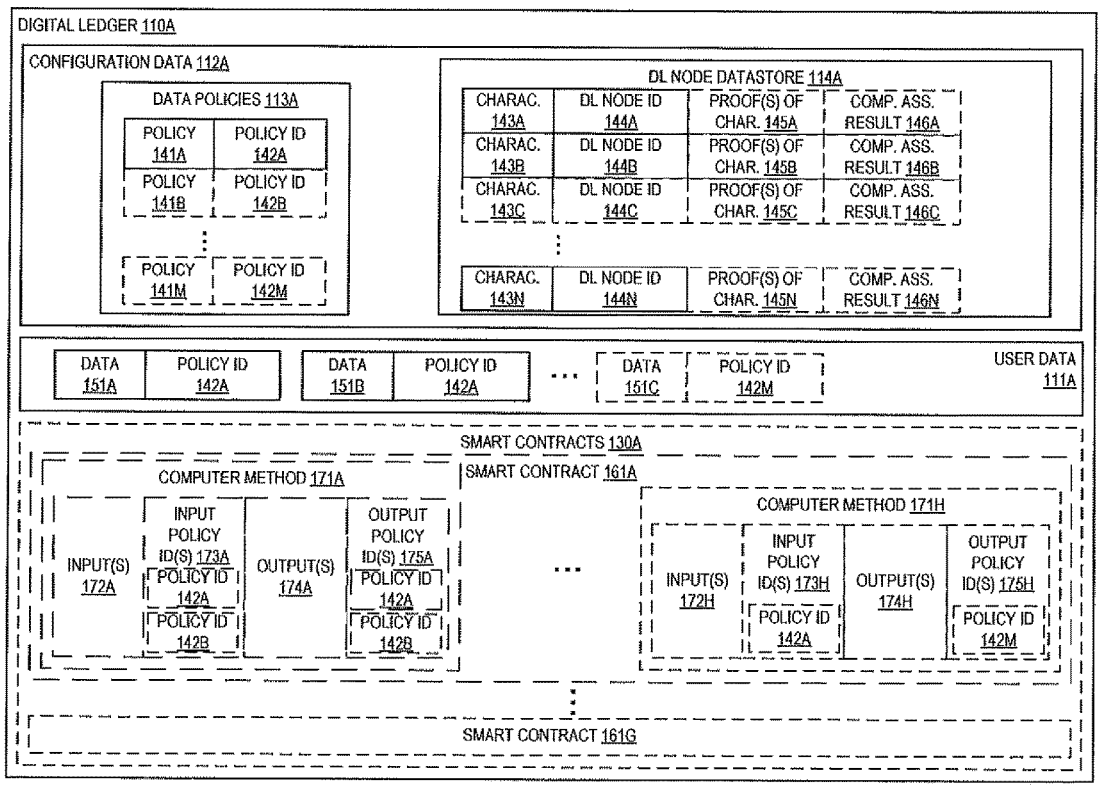
FIG. 1B illustrates a block diagram of detailed user data and configuration data in accordance with some embodiments.

FIG. 1B illustrates a block diagram of detailed user data and configuration data in accordance with some embodiments. The configuration data 112A includes data policies 113A and DL node datastore 114A. The data policies 113A include one or more policies 141A-M, each policy associated with a respective policy identifier 142A-M that uniquely identifies the policy. Each policy 141A includes a detailed description of regulations, legislations, rules, or policies that can be applied to data handled by the DL network 100 and stored in the digital ledger 110A. A policy defines constraints that need to apply when the data is handled in the digital ledger. Handling data may include evaluating transactions, validating transactions, storing transactions, executing smart contracts, retrieving smart contract inputs, storing smart contract outputs, and/or any other operation that can be performed by a DL node on data of the DL network. The constrains that need to be applied on data can include: the geographical area where the data can be stored, the certification that the DL node handling data needs to have, if applicable the data retention period during which the data can be stored, an indication whether the data needs to be anonymized or not, value some configuration parameters should take, etc. In some embodiments, a data policy can indicate the level of confidence that is needed for each one of the constraints. For instance, it can specify that a constraint needs to be endorsed by at least three different participants in the DL network. In these embodiments, two different constraints may be associated with the same level of confidence. Alternatively, two different constraints may be associated with different levels of confidence. In other embodiments, the data policy does not indicate the level of confidence that is needed, and a default level of confidence applies to all constraints and/or all policies, e.g., requiring proofs from all or from a subset of all of the participants for the constraint to be fulfilled in the DL network 100. The policy can also specify how recently the constraints need to have been verified. For instance, a policy can specify that a constraint needs to have been verified for the last time less than few days ago (e.g., 10 days ago, 30 days ago, etc.). For example, a policy may indicate that the geographic location of a DL node needs to be verified (i.e., a proof run for this DL node by one or more entities such as other DL nodes or an external entity such as a certification authority) every ten days.

The DL node datastore 114A includes a set of characteristics 143A-N associated with respective DL node IDs 144A-N that are part of the DL network 100. Each one of the set of characteristics 143A-N include a description of the respective DL node that they are associated to. For example, characteristics 143A include a description of the DL node 102A identified with DL node identifier 144A. The description of the DL node includes the geographical location of the DL node, a set of zero or more standards to which the DL node is compliant (for instance International Organization for Standardization (ISO) 27001 or ISO 14001), configuration values of the DL node (such as data retention period, redundancy, etc.), an indication of the availability of a trusted execution environment or not. As it will be discussed in further detail below, the characteristics of the DL node can be used to assess if the DL node is compliant with a policy or not.

In addition to storing the DL node's characteristics, the DL node datastore 114A can also contain proof of the characteristics for the different DL nodes. The proof of characteristics 145A-N are electronic proofs that prove the validity of the characteristics of the DL nodes 102A-N as stored in the DL node datastore 114A. In some embodiments, the proofs 145A-N can be either a result of an assessment of the characteristics 143A-N stored in DL node datastore 114A that relies on the credibility/reputation of the issuer of the proof. For example, the issuer of the proof can be an external organization endorsing the fact that a DL node is located in a given country (e.g., certification authority 105) or a consortium of the participants in the DL network 100. In some embodiments, the proofs 145A-N can rely on cryptographic methods. For example, a proof that a computer has a trusted execution environment can be established based on a self-assessment performed by the DL node executing assessment code in the trusted execution environment. The assessment code when executed in the trusted execution environment cannot be tampered with and the output of the assessment (e.g., characteristics 143 are valid) is trusted by the participants of the DL network. Alternative mechanisms can be used to establish a proof of the characteristics 143A-N of the DL node as stored in the DL node datastore 114A.

In the embodiments described herein, each data that is stored/recorded in the digital ledger of the DL network 100 is associated with a policy by which it is governed.

The user data 111A includes the transactions recorded in the DL network 100. The user data 111A may include private transactions and public transactions. A public transaction is a transaction that is available to be viewed by all of the participants of the DL network 100. In contrast, a private transaction is only available to be viewed by some of the participants but not by all of the participants of the DL network 100. For private transactions, an identifier of each private transaction is stored in the digital ledger 110A instead of the payload of the transaction. The payload of a transaction contains the actual details about the transaction and is not stored in the digital ledger. This ensures that the payload of any private transaction is not accessible to participants that are not recipients of the transactions. In one example, the identifier of the transaction can be a hash of the payload of the transactions. In the description herein, a recipient of the transaction refers to a participant of the DL network that is allowed to have access/view a private transaction. A private transaction can have one or more recipients. For public transactions, the digital ledger 110A stores the payload of the transactions consequently allowing any participant of the DL network 100 to access/view the payload of these public transactions by accessing the digital ledger 110A. Each transaction includes data (e.g., input and output of the transaction). Each data is associated with a policy. FIG. 1B does not illustrate the transaction but instead the data 151A-C associated with policies. For example, the policy 141A identified with policy ID 142A governs the data 151A. The data 151A is typically part of a transaction recorded in the digital ledger 110A. While not illustrated in FIG. 1B, each transaction (public or private) recorded in the digital ledger may further include additional fields.

In one example, the digital ledger 110A can be a blockchain. In this example, transactions are collected inside blocks that are appended to the blockchain. In addition to the transactions, each block may include additional fields (e.g., a block header). In other examples, the digital ledger 110A can be another structure different from the blockchain that is operative to store private and public transactions.

In some embodiments, in addition to recording data in the digital ledger 110A, the DL node may record the smart contracts 130A. While the term smart contract is used herein, one of ordinary skill in the art would understand that the smart contract stored in the digital ledger 110A refers to the code of the smart contract which when executed generates a digital contract between two parties. The consistency of the code across all the peers is enforced by the DL network 100. When compared to smart contracts from existing DL networks, the smart contracts 130A of the embodiments herein, are associated with policies that govern the data involved in the smart contract. For example, the smart contracts 130A may include one or more smart contracts 161A-G. Each one of the smart contracts 161A-G includes a set of methods 171A-H, which define procedures applied on inputs 172A-H to obtain outputs 174A-H. Each method may include a set of one or more inputs 172A-H and a set of one or more outputs 174A-H. Each one of the methods 171A-H specifies the policies 173A-H that are accepted for the data passed as inputs, as well as the policies 175A-H that govern each data output 174A-H. For example, the computer method 171A includes a policy identified with policy ID 142A that applies to both an input and an output of the computer method 171A. In some embodiments, a computer method 171A may have multiple policies, e.g., identified with policy IDs 142A and 142B, that can apply to different ones of the inputs of the computer method 171A. In other embodiments, a single policy identified with policy ID 142A applies to multiple ones of the inputs 172A. In some embodiments, the same policy, e.g., policy ID 142A, applies to both the inputs 172A and the outputs 174A of the computer method 171. In alternative embodiments, different policies may apply to the inputs and the outputs of a computer method. For example, computer method 171H includes policy identifier 142A that defines the policy that applies to the inputs 172H of the computer method 171H and policy identifier 142M that identifies the policy that applies to the outputs 175H. In some embodiments, some or all of the inputs and or the outputs of a smart contract may not be associated with any policy indicating that any DL node of the DL network 100 is authorized to handle and store the smart contract without any constraints on the data. The specification of the input/output policies can either be performed by the programmer writing the smart contracts 130A, or entered as configuration values when the smart contract is deployed. While the illustrated example shows that the inputs and outputs of a computer method are associated with policy identifiers, in some embodiments, these policy identifiers can be passed at run-time (for instance as an argument to the smart contract or inferred from the input data) without the smart contracts storing the policies for each input.

The DL network 100 is configured and is operative to handle data associated with policies. The operations of the DL nodes in the DL network 100 are described in further detail with reference to FIGS. 2A-3D.

DL Network Configuration

Figure 2A:
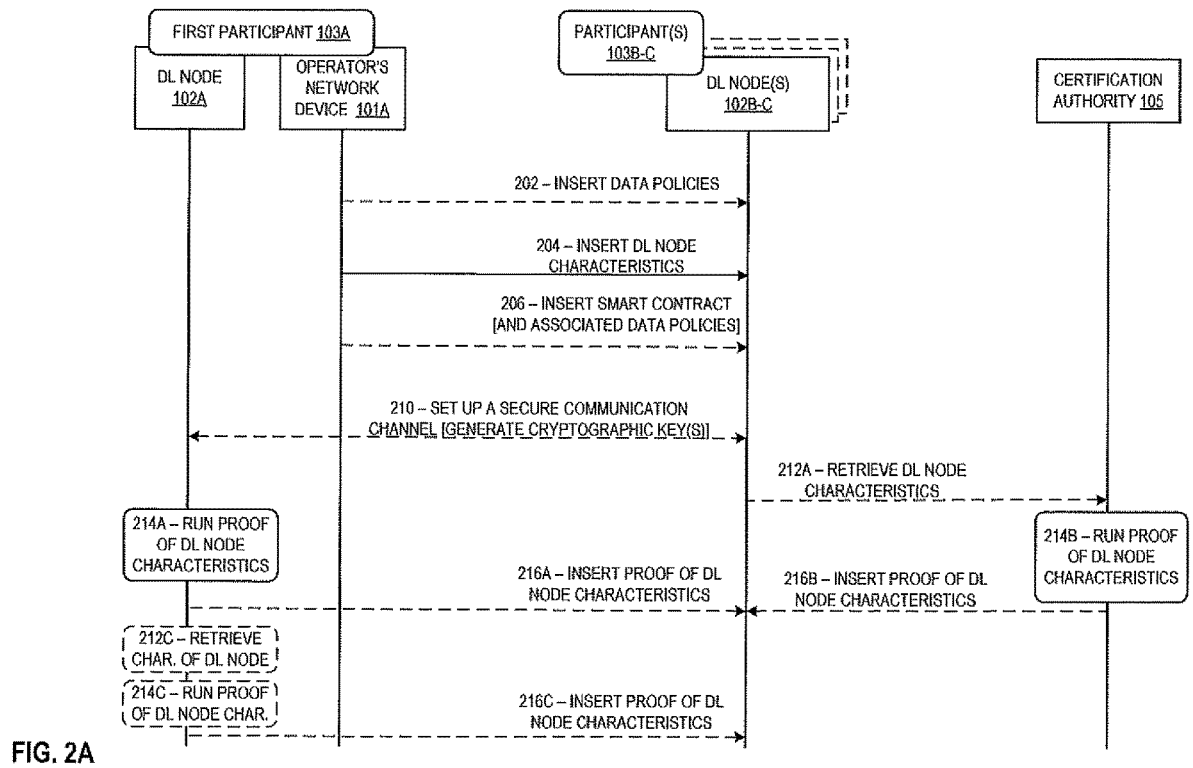
FIG. 2A illustrates a block diagram of exemplary operations that can be performed in a DL network for configuration of DL nodes, in accordance with some embodiments.

FIG. 2A illustrates a block diagram of exemplary operations that can be performed in a DL network for configuration of DL nodes, in accordance with some embodiments. The first participant 103A owns or operates one or multiple network devices (NDs) including the DL node 102A and an operator's network device 101A. The operator's ND 101A is used to configure components of the DL network 100. In some embodiments, the operator's ND 101A can be included in a set of one or more NDs that implement the DL node 102A. In other embodiments, the operator's ND 101A can be separate from the set of one or more NDs that implement the DL node 102A. The operator's ND 101A can be coupled with the DL node 102A and one or more other DL nodes of the DL network 100 through a network.

An operator of the participant 103A uses the operator's ND 101A to configure the DL network 100 with characteristics of the DL node 102A and zero or more policies for the data that are to be handled by the DL network 100. In some embodiments, the operations described herein can be performed by each one of the DL nodes 102A-C, alternatively, a subset of the DL nodes 102A-C may perform a subset of these operations. For example, a subset of the DL nodes, which is less than the entire set of DL nodes of the DL network 100, are operative to insert policies for the data handled by all of the DL nodes of the DL network 100. The operator's ND 101A inserts, at operation 202, data policies. The data policies relate to one or more types of data handled by the DL network 100. The policies are described in further detail with respect to FIG. 1A-B. The description of the policies that are inserted into the digital ledger are shared by all the participants of the DL network 100. To modify a description of an inserted policy, approbation from other participants in the DL network 100 is needed.

At operation 204, the operator's ND 101A is used to insert the characteristics of the DL node 102A into the digital ledger of the DL network 100. The operator of each participant uses the corresponding operator's ND to perform operation 204. For example, the DL node characteristics, e.g., characteristics 143A for DL node 102A (identified with DL node ID 144A) are inserted in the digital ledger 110A. The characteristics can be associated with proofs available to the operators at the time of insertion (e.g., proof of char. 145A). In some embodiments, the operator may have access or is able to run proofs (operation 214A) of all of the characteristics of the DL node 102A (e.g., location, capabilities, standard supported, secure software/hardware capabilities, etc.) and insert, operation 216A these proofs into the digital ledger of the DL network 100. In other embodiments, the operator is able to run and insert only a subset of these proofs for the DL node 102A at the time of configuration of the DL network with the characteristics of the DL node 102A. The operation 204 can be performed at an initialization stage when the node is included to the DL network 100. Alternatively, the operation 204 can be performed when the characteristics of the DL node 102A change and these characteristics are updated in the DL network 100 by inserting the new characteristics. The other participants are notified when the characteristics of a DL node change.

At operation 206, the operator uses the operator's DL node 101A to insert one or more smart contracts into the digital ledger of the DL network 100 with associated data policies. As described with reference to FIG. 1A-B, the smart contract may include policies associated with the inputs and/or outputs of the smart contract. Alternatively, the insertion of the smart contract does not include the insertion of the policies for the inputs or outputs and these policies are derived based on the source code of the smart contract or defined only at run-time.

In some embodiments, the configuration stage may further include operation 210 at which the different DL nodes of the DL network 100 set up a secure communication channel that ensures private and authenticated communication between the DL nodes. In some embodiments, setting up a secure communication channel includes generating cryptographic keys that are to be used to encrypt any communication between DL nodes that handle data under the same policies. For instance, the DL nodes may participate in a protocol for generation of a symmetric key for each policy and have it securely distributed among all the DL nodes that comply with this policy. In other embodiments, setting up a secure communication includes opening a secure channel between two DL nodes that comply to the same policy.

After the DL network 100 is configured, a participant or an external entity can periodically measure and verify the characteristics of a DL node. This helps ensure that the characteristics of a DL node or a change in the characteristics of the DL node is reflected in the digital ledger. For example, an entity (participant(s) or external entity) can verify the geolocation of a DL node, e.g., DL node 102B. In a non-limiting example, this can be done by using a traceroute command transmitted from a ND to DL node 102B to get information regarding the geographical location of the DL node 102B. In another example, the ND can connect to the DL node 102B to verify the version of the software it is running. Based on the verification of the characteristics of DL node 102B, the ND signs and inserts a proof of the characteristics in the configuration data 112A (e.g., in the DL node datastore 114A). In some embodiments, each proof of characteristics stored in the DL node datastore 114A is associated with a time indicator that indicates the time at which the proof was inserted into the digital ledger 110A. Each one of the DL nodes identified in the DL node datastore 114A can be associated with one or more proofs of characteristics that are inserted over time for the DL node. The different proofs may reflect different versions and updates of the DL node as its characteristics may change over time.

In some embodiments, external entities, such as the certification authority 105, are operative to retrieve DL node characteristics from the digital ledger of the DL network 100, at operation 212. The certification authority is further operative to run and insert proofs (operations 214B and 216B) of the characteristics of the DL nodes. For instance an independent audit company can vouch for the compliance of a DL node to a standard (such as ISO 27001 or ISO 14001). The verification performed by the certification authority 105 can be performed offline, for instance in the context of an audit of the participant. In other embodiments, a participant, e.g., participant 103A can verify one or more characteristics of a node of another participant. For example, participant 103A through DL node 102A is operative to retrieve from the digital ledger of the DL network 100 DL node characteristics of another node, e.g., DL node 102B, at operation 212A. DL node 102A is further operative to run and insert proofs (operations 214C and 216C) of the characteristics of this other DL node 102B into the digital ledger 110A. In some embodiments, the proofs of characteristics of DL nodes can be run and inserted by one or a combination of DL nodes and external entities. The insertion of the policies, the characteristics of DL nodes, and/or proofs of characteristics into the digital ledger 110A is performed through a consensus mechanism that involves multiple ones of the DL nodes forming the DL network. At the end of the configuration stage, the DL nodes 102 of the multiple participants 103A-C have access to the definitions of all policies under which data is to be handled in the DL network 100, as well as to the characteristics of the DL nodes that form the DL network. As a result, each DL node, e.g., DL node 102A, has a complete view on the policies that each one of the other DL nodes complies with.

Figure 2B:
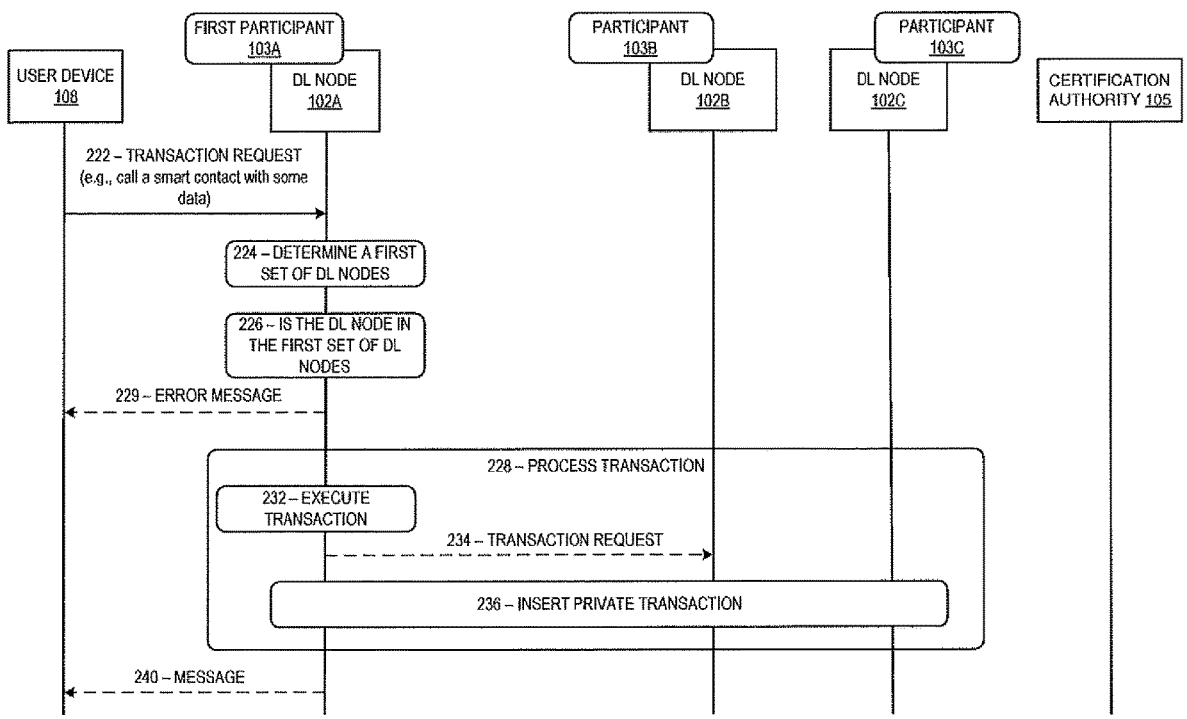
FIG. 2B illustrates a block diagram of exemplary operations that can be performed in a DL network for processing of transactions based on policies, in accordance with some embodiments.
Figure 3A:
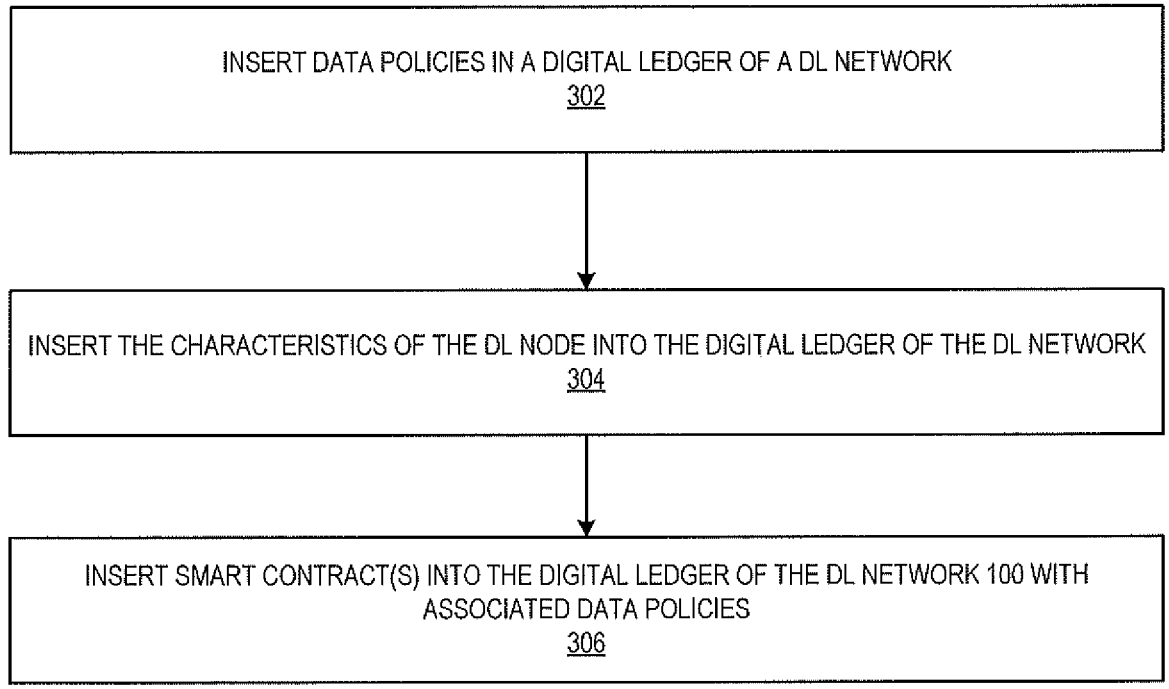
FIG. 3A illustrates a flow diagram of exemplary operations that can be performed in a DL network for configuration of DL nodes, in accordance with some embodiments.

FIG. 3A illustrates a flow diagram of exemplary operations that can be performed in a DL network for configuration of DL nodes, in accordance with some embodiments. The operations in the flow diagram will be described with reference to the exemplary embodiments of FIG. 1A to FIG. 2B. However, it should be understood that the operations of the flow diagram can be performed by embodiments of the invention other than those discussed with reference to FIG. 1A to FIG. 2B, and the embodiments of the invention discussed with reference to FIG. 1A to FIG. 2B can perform operations different than those discussed with reference to the flow diagram.

The first participant 103A owns or operates one or multiple NDs including the DL node 102A and an operator's ND 101A. In some embodiments, the operations of FIG. 3A can be performed using a ND of an operator (e.g., the operator's ND 101A). In some embodiments, the operator's ND 101A can be included in a set of one or more NDs that implement the DL node 102A. In other embodiments, the operator's ND 101A can be separate from the set of one or more NDs that implement the DL node 102A. The operator's ND 101A can be coupled with the DL node 102A and one or more other DL nodes of the DL network 100 through a network.

An operator of the participant 103A uses the ND 101A to configure the DL network 100 with characteristics of the DL node 102A and zero or more policies for the data that are to be handled by the DL network 100. In some embodiments, the operations described herein can be performed by each one of the DL nodes 102A-C, alternatively, a subset of the DL nodes 102A-C may perform a subset of these operations. For example, a subset of the DL nodes, which is less than the entire set of DL nodes of the DL network 100, are operative to insert policies for the data handled by all of the DL nodes of the DL network 100. The operator's ND 101A inserts, at operation 302, data policies. The data policies relate to one or more types of data handled by the DL network 100. The policies are described in further detail with respect to FIG. 1A-B. The description of the policies that are inserted into the digital ledger are shared by all the participants of the DL network 100. To modify a description of an inserted policy, approbation from other participants in the DL network 100 is needed.

At operation 304, the operator's DL 101A requests insertion of the characteristics of the DL node 102A into the digital ledger of the DL network. The operator of each participant uses the corresponding operator's ND to perform operation 204. For example, the characteristics of the DL node, e.g., characteristics 143A for DL node 102A (identified with DL node ID 144A) are inserted in the digital ledger 110A. The characteristics can be associated with proofs that are available to the operators at the time of insertion (e.g., proof of char. 145A). In some embodiments, the operator may have access or is able to run proofs (operation 214A) of all of the characteristics of the DL node 102A (e.g., location, capabilities, standard supported, secure software/hardware capabilities, etc.) and insert, operation 216A these proofs into the digital ledger of the DL network 100. In other embodiments, the operator is able to run and insert only a subset of these proofs for the DL node 102A at the time of configuration of the DL network with the characteristics of the DL node 102A. The operation 204 can be performed at an initialization stage when the node is included to the DL network 100. Alternatively, the operation 204 can be performed when the characteristics of the DL node 102A change and these characteristics are updated in the DL network 100 by inserting the new characteristics. The other participants are notified when the characteristics of a DL node change.

At operation 306, the operator uses the operator's DL node 101A to insert one or more smart contracts into the digital ledger of DL network 100 with associated data policies. As described with reference to FIG. 1A-B, the smart contract may include policies associated with the inputs and/or outputs of the smart contract. Alternatively, the insertion of the smart contract does not include the insertion of the policies for the inputs or outputs and these policies are derived based on the source code of the smart contract or defined only at run-time.

In some embodiments, the configuration stage may further include additional operations at which the different DL nodes of the DL network 100 set up a secure communication channel that ensures private and authenticated communication between the DL nodes. In some embodiments, setting up a secure communication channel includes generating cryptographic keys that are to be used to encrypt any communication between DL nodes that handle data under the same policies. For instance, the DL nodes may participate in a protocol for generation of a symmetric key for each policy and have it securely distributed among all the DL nodes that comply with this policy. In other embodiments, setting up a secure communication includes opening a secure channel in the DL network between two DL nodes that comply to the same policy.

When the DL network 100 is configured, a participant or an external entity can periodically measure and verify the characteristics of a DL note after DL network 100. This helps ensure that a change in the characteristics of a DL node is reflected in the ledger. In some embodiments, external entities, such as the certification authority 105, are operative to run and insert proofs of the characteristics of the DL nodes. For instance, an independent audit company can vouch for the compliance of a DL node to a standard (for instance ISO 27001 or ISO 14001). The verification performed by the certification authority 105 can be performed offline, for instance in the context of an audit of the participant. In other embodiments, a participant, e.g., participant 103A can verify one or more characteristics of a node of another participant. For example, the participant 103A can verify the geolocation of a DL node of another participant. In a non-limiting example, this can be done by using a traceroute command transmitted from DL node 102A to DL node 102B to get information regarding the geographical location of the DL node 102B. In another example, the DL node 102A can connect to the DL node 102B to verify the version of the software it is running. Based on the verification of the characteristics of a DL node 102B of another participant 103B, the DL node 102A signs and inserts a proof of the characteristics in the configuration data 112A (e.g., in the DL node datastore 114A). In some embodiments, each proof of characteristics stored in the DL node datastore 114A is associated with a time indicator that indicates the time at which the proof was inserted into the digital ledger 110A. Each one of the DL nodes identified in the DL node datastore 114A can be associated with one or more proofs of characteristics that are inserted over time for the DL node. The different proofs may reflect different versions and updates of the DL node as its characteristics may change over time. In some embodiments, the proofs of characteristics of DL nodes can be run and inserted by one or a combination of DL nodes and external entities. The execution of the proofs of the characteristics of the DL nodes can be performed periodically independent of the configuration stage of the DL network.

The insertion of the policies, the characteristics of DL nodes, and/or proofs of characteristics into the digital ledger 110A is performed through a consensus mechanism that involves multiple ones of the DL nodes forming the DL network. At the end of the configuration stage, the DL nodes 102 of the multiple participants 103A-C have access to the definitions of all policies under which data is to be handled in the DL network 100, as well as to the characteristics of the DL nodes that form the DL network. As a result, each DL node, e.g., DL node 102A, has a complete view on the policies that each one of the other DL nodes complies with.

Policy Implementation:
Transaction Processing

FIG. 2B illustrates a block diagram of exemplary operations that can be performed for processing transactions based on policies, in accordance with some embodiments.

At operation 222, the user submits a transaction request to the DL network 100. The transaction request is a request for execution of a transaction in the DL network 100. The transaction request is transmitted from the user device 108 to the DL node 102A. The request for the transaction includes data and is received at the DL node 102A from the user device 108. The transaction request can be a request for executing a transaction (e.g., transfer of cryptocurrency) between two participants. Alternatively or additionally, the transaction request can be a call to a smart contract with a set of inputs (e.g., a call to a method of a smart contract). The smart contract includes a set of inputs and outputs. In some embodiments, the user can specify one or more policies that govern the data in the transaction request. For example, when the transaction request is a call to a smart contract's method, the policies can be associated with the data passed as inputs to the method. Alternatively, when the transaction is not a call to a smart contract, the policies are associated with the input of the transaction. In other embodiments, the user does not specify the policies that govern the transaction request.

Upon receipt of the transaction request, the DL node 102A determines, at operation 224, a first set of DL nodes of the DL network that have characteristics that satisfy the policies associated with the data of the transaction that is performed. For example, the DL node 102A may determine that DL node 102B has characteristics that satisfy the policies associated with the data of the transaction while the characteristics of DL node 102C do not satisfy these policies. In this example, determining the first set of DL nodes includes determining at least the identifier of the DL node 102B. In some example, determining the first set of DL nodes further includes determining the identifier of DL node 102A in addition to the identifier of DL node 102B. In some embodiments, determining the first set of DL nodes includes retrieving the one or more policies associated with the data from the digital ledger of the DL network, retrieving the characteristics of the DL nodes from the digital ledger 110A of the DL network 100, and comparing the characteristics of the DL nodes to the policies. For example, the DL node 102A accesses the digital ledger 110A to retrieve the characteristics 143A-N of the DL nodes 102A-N that are identified with respective IDs 144A-N. In some embodiments, the DL node 102A retrieves the policies associated with the data from the transaction request as these policies are submitted from the user. In other embodiments, the DL node 102A retrieves the policies associated with the data from the user data 111A. In some embodiments, the DL node 102A may retrieve policies associated with the data from the digital ledger and compare them with any policies that are received from the user. In these embodiments, if the policies submitted by the user are not compatible with the policies retrieved from the digital ledger, the processing of the transaction request is stopped. In some embodiments, the DL node may transmit an error message to the user device 108 to inform the user 107 that the processing of the request did not succeed. Alternatively, the DL node 102A does not transmit any messages to the user device and the user 107 is not informed that the transaction request was not processed. In some embodiments, retrieving the policies may include determining the policy ID associated with the data (from the request or from the user data 111A stored in the digital ledger) and retrieving from the data policies 113A in the digital ledger the descriptions 141A-M associated with the respective policy IDs 142A-M.

In some embodiments, the transaction request is a call to a method of a smart contract. The call to the method may include metadata including policies that are associated with the inputs of the method. In these embodiments, the DL nodes 102A retrieves the policies associated with the data from the smart contracts 130A and the data policies 113A. For example, if the call for the method is a call to computer method 171A, the DL node 102A determines that policy IDs 142A and 142B are associated with the inputs 173A of the computer method 171A. The DL node 102A determines from the data policies 113A the description of the policies 141A and 141B that are respectively associated with the policy IDs 142A and 142B. Based on the policies provided by the user 107, as well as the policies retrieved based on the smart contracts 130A in the digital ledger, the DL node 102A identifies the policies that apply to the input data. In these embodiments, if the policies submitted by the user are not compatible with the policies retrieved from the digital ledger, the processing of the transaction request is stopped. In some embodiments, the DL node may transmit an error message to the user device 108 to inform the user 107 that the processing of the request did not succeed. Alternatively, the DL node 102A does not transmit any messages to the user device and the user 107 is not informed that the transaction request was not processed.

The DL node 102A compares the policies retrieved from the digital ledger for the data (i.e., the descriptions 141A-B) with the characteristics 143A-N of the DL nodes and determines the DL nodes that have characteristics satisfying the policies. Determining that a DL node's characteristics satisfy a policy may include the determination that the DL node is located in a geolocation in which the policy is applied, the software and hardware characteristics of the DL node satisfy any requirements set in the policy, and/or that the data retention period in the DL node conforms to what is required by the policy, etc. Different characteristics and policy constraints can be considered based on the type of policies, the type of data, and the type of application that the DL network 100 implements.

Upon determination of the set of DL nodes, the DL node determines, at operation 226, whether it is part of the first set of DL nodes. For example, the DL node may determine whether an identifier of the DL node 102A is included in a list of identifiers of the first set of DL nodes. Responsive to determining that the DL node is one of the first set of DL nodes, the DL node performs the operation 228, at which the transaction is processed. Alternatively, responsive to determining that the DL node 102A is not one of the first set of DL nodes, the processing of the transaction is stopped, and the DL node 102A transmits, at operation 229, an error message to the user device informing the user that the transaction cannot be processed.

In some embodiments, processing the transaction at operation 228 includes operations 232-236. At operation 232, the DL node 102A executes the transaction. The execution of the transaction includes evaluating the transaction to determine the outcome of the transaction and storing the transaction. For example, when the transaction request is a call to a smart contract, executing the transaction includes executing the smart contract with the inputs from the user device provided in the transaction request. In some embodiments, storing the transaction is performed directly into a computer readable storage medium of the DL node (or accessible to the DL node) without any encryption. This allows the operator of the DL node to access the transaction, which has the downside of potentially having the transaction be handled in violation of the policies associated with the data of the transaction. In other embodiments, storing the transaction may include encrypting the transaction to obtain an encrypted transaction. The encrypted transaction is then stored in the DL node 102A instead of the transaction. When the transaction is stored encrypted, the encryption keys are protected from access by the operator of the DL node. This can be done using a trusted execution engine. In such a case, even the DL node's operator cannot access the transaction. As a result, the transaction can only be accessed following the procedures established in the DL network 100, and thus in a manner that complies with the policies that govern the data of the transaction.

At operation 234, transaction request is transmitted to at least one of the first set of DL nodes, here DL node 102B. The transaction request is transmitted to at least one of the first set of DL nodes to be executed (and stored) by these nodes. However, the transaction request is not transmitted to all of the nodes of the DL network (e.g., the transaction request is not transmitted to DL node 102C). According to the operations described herein, the DL node transmits the transaction to the DL nodes that satisfy the policies of the data ensuring that the DL nodes that do not comply with the policies do not receive/process or have access to this data. In some embodiments, prior to transmitting the transaction to the DL node 102B, the DL node 102A may further verify that any requirements or constraints received from the user with the transaction request are satisfied. In other embodiments, the DL node 102A does not receive additional constraints or requirements from the user device and there is no such verification that is performed. When the verification is performed, the DL nodes 102A transmits the transaction request to the DL node 102B when these additional constraints are satisfied by the selected node. If the additional constraints are not satisfied, the transaction request is not transmitted to the DL node 102B. In some examples, the set of DL nodes may include more than one DL node that satisfy the policies of the data of the transaction and in these example, this set of DL nodes may be further be filtered based on the additional constraints received from the user. In this example, the DL node 102A transmits the transaction request to a subset of the first set of DL nodes. In some embodiments, the transmission of the transaction to at least one of the first set of DL nodes is performed through the secure channel established between the DL node 102A and these other DL nodes, e.g., DL node 102B. In some embodiments, the DL node 102A is determined to be the only DL node that satisfies the policies of the data of the transaction and the transaction request is not transmitted to any other DL node of the DL network 100, instead the transaction is executed at the DL node 102A and is inserted as a private transaction into the digital ledger 110A.

At operation 236, the transaction is inserted as a private transaction in the digital ledger 110A. Inserting the private transaction in the digital ledger 110A is performed by replacing the transaction with an identifier of the transaction (e.g., a hash of the transaction) to be inserted into the digital ledger. Thus, instead of inserting the payload of the transaction, which includes the details of the transaction, the DL node 102A causes insertion of an identifier of the transaction. The identifier uniquely identifies the transaction without revealing the details of the transaction and can be used to verify the authenticity of the transaction data. The insertion of the identifier in the digital ledger 110A is performed through a consensus mechanism between the DL nodes in the DL network 100. This consensus mechanism may include DL nodes that satisfy the policies of the data of the transaction and/or DL nodes that do not satisfy the policies of the data of the transaction. The transmission of the transaction to the set of DL nodes and the insertion of the transaction as a private transaction causes a set of one or more DL nodes of the DL network that is different from the set of DL nodes to access only an identifier of the transaction and not the payload of the transaction.

In some embodiments, the operations 228 may further include additional operations. The DL node 102A may further be operative to respond to the user of the user device following the execution of the transaction. In other embodiments, the user device does not expect a response and these operations are not performed. The DL node determines whether the user of the user device is authorized to receive a result of the execution of the transaction. For example, this determination can be performed based on credentials of the user, such as a password and a username, or other mechanism. The credentials of the user can be received by the DL node 102A with the request. In another example, the credentials may have been stored in the configuration data of the digital ledger during a registration phase during which the user registers for the DL network 100. Based on these credentials, the DL node 102A determines if the user is allowed to access the return value of the execution of the transaction. When it is determined that the user is authorized to access the result of the execution of the transaction, the DL node 102A transmits (message 240) a response including the result of the transaction. When it is determined that the user is not authorized to access the result of the execution of the transaction, the DL node transmits a response including a confirmation that the execution of the transaction was successful without transmitting the return value that results from the execution of the transaction.

The operations in the flow diagram of FIG. 3B will be described with reference to the exemplary embodiments of FIGS. 1A-B and FIG. 2B. However, it should be understood that the operations of the flow diagrams can be performed by embodiments of the invention other than those discussed with reference to FIGS. 1A-B and FIG. 2B, and the embodiments of the invention discussed with reference to FIGS. 1A-B and FIG. 2B. 2B can perform operations different than those discussed with reference to the flow diagrams.

Figure 3B:
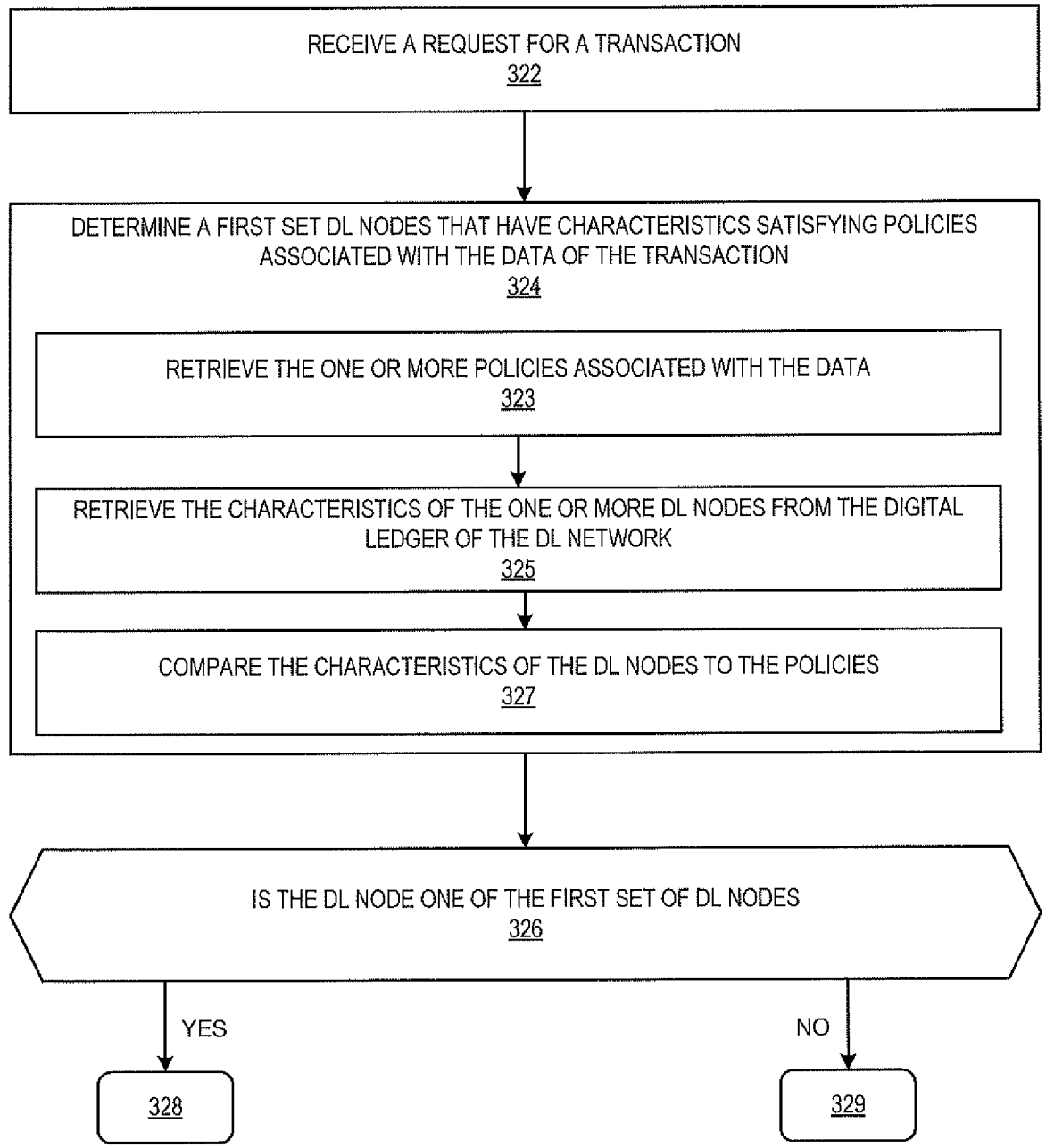
FIG. 3B illustrates a flow diagram of exemplary operations that can be performed in a DL network for processing of transactions based on policies, in accordance with some embodiments.

FIG. 3B illustrates a flow diagram of exemplary operations that can be performed in a DL network for processing of transactions based on policies, in accordance with some embodiments. The operations of FIG. 3B can be performed by a DL node of the DL network 100, e.g., DL node 102A.

At operation 322, a request for a transaction including data is received at the DL node 102A from a user device, e.g., user device 108. In some embodiments, the request for the transaction is a call for a smart contract and the data includes a set of one or more inputs and a set of one or more outputs of the method of the smart contract. The flow of operations moves to operation 324, at which a determination of a first set of one or more DL nodes of the DL network that have characteristics that satisfy one or more policies associated with the data of the transaction is performed. In some embodiments, determining the first set of DL nodes includes retrieving, at operation 323, the one or more policies associated with the data from the digital ledger of the DL network, retrieving, at operation 325, the characteristics of the DL nodes from the digital ledger 110A of the DL network 100, and comparing, at operation 327, the characteristics of the DL nodes to the policies. In some embodiments, the DL node 102A retrieves the policies associated with the data from the transaction request as these policies are submitted from the user. In other embodiments, the DL node 102A may retrieve the policies associated with the data from the user data 111A. In some embodiments, retrieving the policies may include determining the policy ID associated with the data (from the request or from the user data 111A stored in the digital ledger) and retrieving from the data policies 113A in the digital ledger the descriptions 141A-M associated with the respective policy IDs 142A-M. In some embodiments, retrieving the characteristics of the DL nodes includes the DL node 102A accessing the digital ledger 110A to retrieve the characteristics 143A-N of the DL nodes 102A-N that are identified with respective IDs 144A-N. The DL node 102A compares these policies (i.e., the descriptions 141A-M) with the characteristics 143A-N of the DL nodes and determines the DL nodes that have characteristics satisfying the policies. Determining that a DL node's characteristics satisfy a policy may include the determination that the DL node is located in a geolocation in which the policy is applied, the software and hardware characteristics of the DL node satisfy any requirements set in the policy, and/or that the data retention period in the DL node conforms to what is required by the policy, etc. Different characteristics and policy constraints can be considered based on the type of policies, the type of data, and the type of application that the DL network 100 implements.

The flow moves to operations 326, at which the DL node determines whether it is part of the first set of DL nodes. For example, the DL node may determine whether an identifier of the DL node is included in a list of identifiers of the first set of DL nodes. Responsive to determining that the DL node is one of the first set of DL nodes, the operations move to operation 328. Alternatively, responsive to determining that the DL node is not one of the first set of DL nodes, the flow of operations moves to operation 329.

Figure 3C:
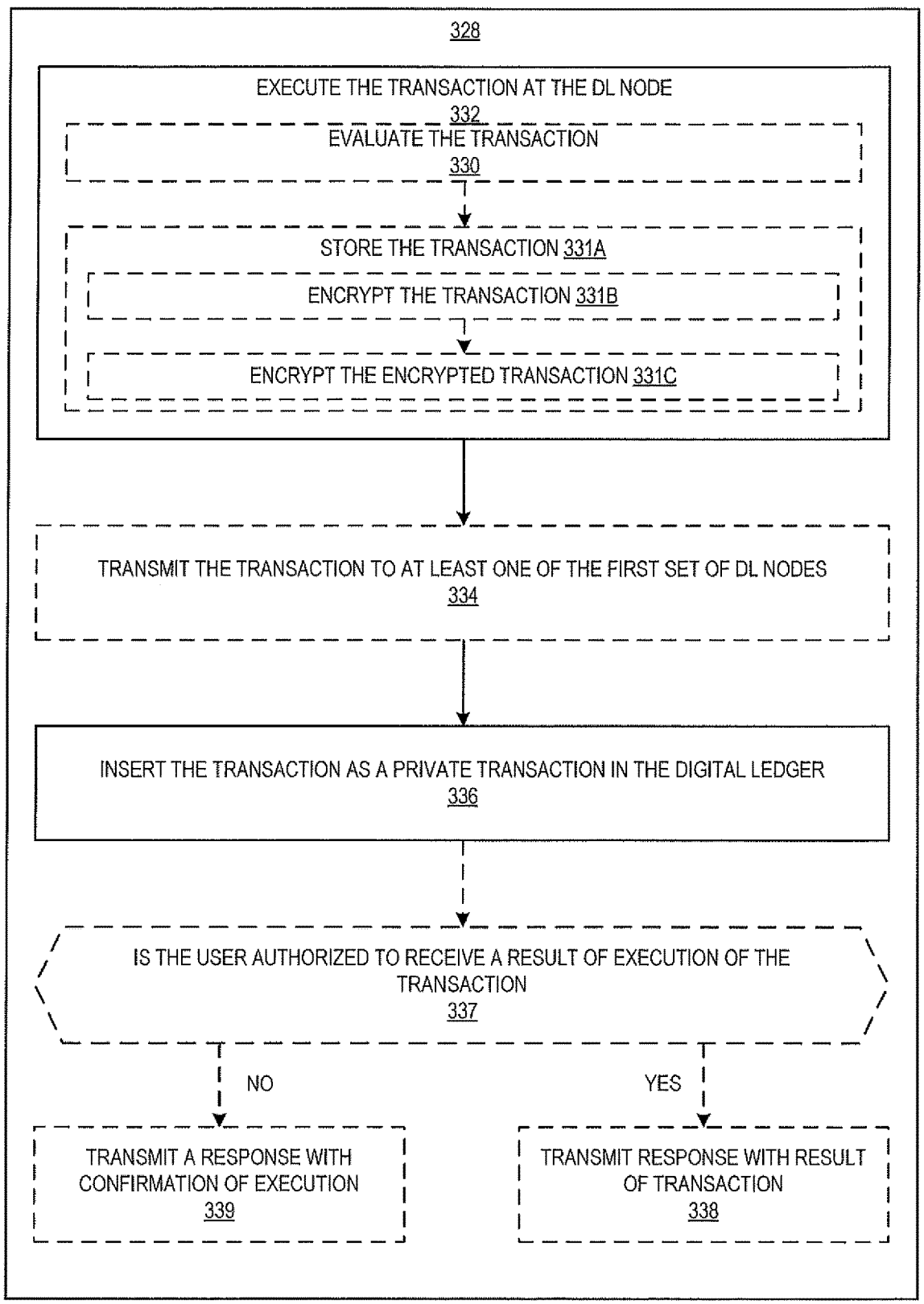
FIG. 3C illustrates a flow diagram of exemplary operations that can be performed in response to determining that the DL node is one of the first set of DL nodes, in accordance with some embodiments.

FIG. 3C illustrates a flow diagram of exemplary operations that can be performed in response to determining that the DL node is one of the first set of DL nodes, in accordance with some embodiments. The operations 328 includes operations 332-336. At operation 332, the DL node 102A executes the transaction. The execution of the transaction includes evaluating the transaction, operation 330, to determine the outcome of the transaction and storing the transaction 331A. In some embodiments, storing the transaction is performed directly into a computer readable storage medium of the DL node (or accessible to the DL node) without any encryption. This allows the operator of the DL node to access the transaction, which has the downside of potentially having the transaction be handled in violation of the policies associated with the data of the transaction. In other embodiments, storing the transaction may include encrypting the transaction, operation 331B, to obtain an encrypted transaction. The encrypted transaction is then stored, operation 331C, in the DL node 102A instead of the transaction. When the transaction is stored encrypted, the encryption keys are protected from access by the operator of the DL node. This can be done using a trusted execution engine. In such a case, even the DL node's operator cannot access the transaction. As a result, the transaction can only be accessed following the procedures established in the DL network 100, and thus in a manner that complies with the policies that govern the data of the transaction.

The flow of operations moves to operation 334, at which the transaction is transmitted to at least one of the first set of DL nodes. According to the operations described herein, the DL node transmits the transaction to the DL nodes that satisfy the policies of the data ensuring that the DL nodes that do not comply with the policies do not receive/process or have access to this data. The transmission of the transaction to the DL nodes is performed through the secure channel established between the DL node 102A and these other DL nodes. The flow of operations moves to operation 336, at which the transaction is inserted as a private transaction in the digital ledger 110A. Inserting the private transaction in the digital ledger 110A is performed by replacing the transaction with an identifier of the transaction (e.g., a hash of the transaction) to be inserted into the digital ledger. Thus, instead of inserting the payload of the transaction, which includes the details of the transaction, the DL node 102A causes insertion of an identifier of the transaction. The identifier uniquely identifies the transaction without revealing the details of the transaction. The insertion of the identifier in the digital ledger 110A is performed through a consensus mechanism between the DL nodes in the DL network 100. This consensus mechanism may include DL nodes that satisfy the policies of the data of the transaction and/or DL nodes that do not satisfy the policies of the data of the transaction. The transmission of the transaction to the set of DL nodes and the insertion of the transaction as a private transaction causes a second set of one or more DL nodes of the DL network that is different from the set of DL nodes to access only an identifier of the transaction and not the payload of the transaction.

In some embodiments, the operations 328 may further include operations 337-339. The DL node 102A may further be operative to respond to the user of the user device following the execution of the transaction. In other embodiments, the user device does not expect a response and these operations are not performed. At operation 337, the DL node determines whether the user of the user device is authorized to receive a result of the execution of the transaction. For example, this determination can be performed based on credentials of the user, such as a password and a username, or other mechanism. The credentials of the user can be received by the DL node 102A with the request. In another example, the credentials may have been stored in the configuration data of the digital ledger during a registration phase during which the user registers for the DL network 100. Based on these credentials, the DL node 102A determines if the user is allowed to access the return value of the execution of the transaction. When it is determined that the user is authorized to access the result of the execution of the transaction, the flow of operations moves to operation 338. At operation 338, the DL node 102A transmits a response including the result of the transaction. When it is determined that the user is not authorized to access the result of the execution of the transaction, the flow of operations moves to operation 339. At operation 339, the DL node transmits a response including a confirmation that the execution of the transaction was successful.

Figure 3D:
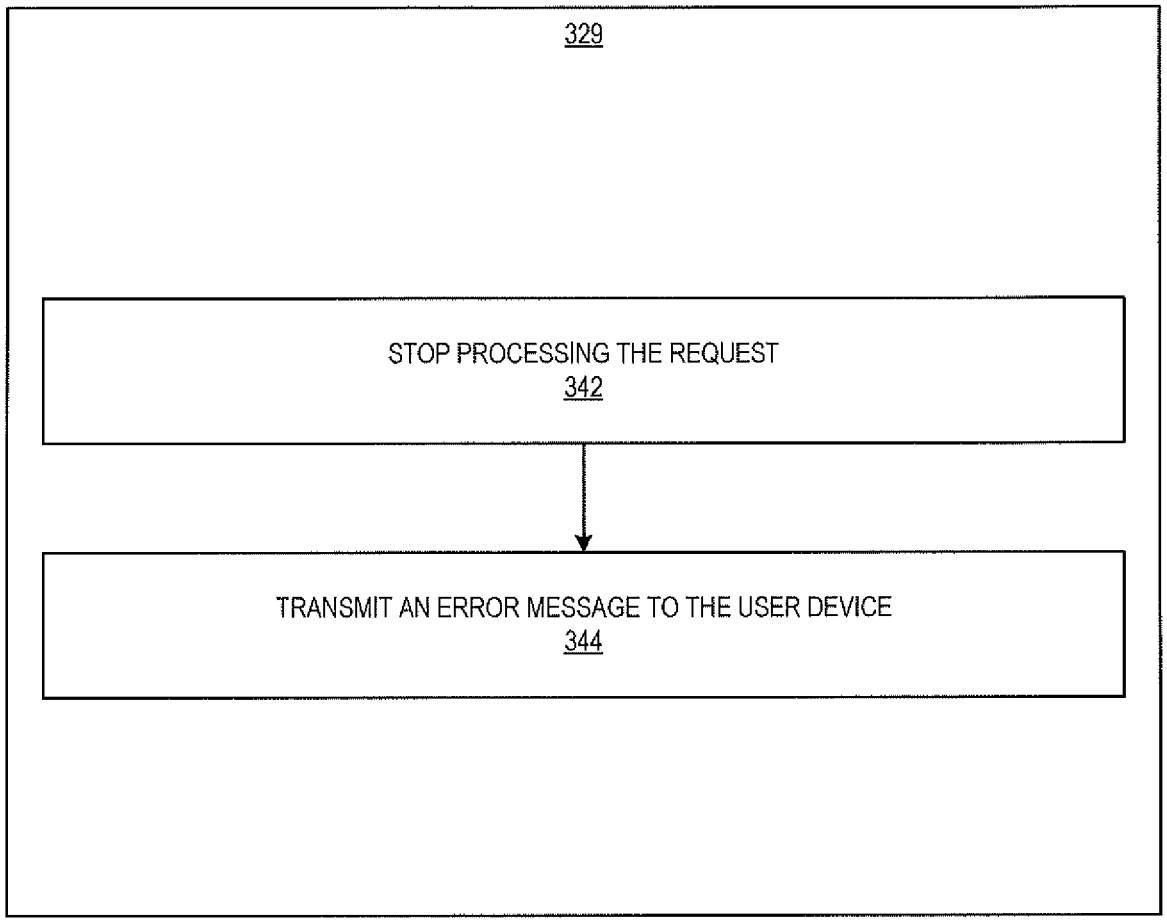
FIG. 3D illustrates a flow diagram of exemplary operations that can be performed in response to determining that the DL node is not one of the set of DL nodes, in accordance with some embodiments.

FIG. 3D illustrates a flow diagram of exemplary operations that can be performed in response to determining that the DL node is not one of the set of DL nodes, in accordance with some embodiments. In some embodiments, the DL node that receives the request is not a DL node that satisfies the policies of the data of the transaction. This node may have one or more characteristics (e.g., geolocation, software version, hardware implementations, and/or other characteristics) that do not satisfy the policies of the data. In these embodiments, responsive to determining that the DL node is not one of the DL nodes authorized to process the request for the transaction, operations 342-344 are performed. At operation 342, the DL node 102A stops processing of the request, and transmits (at operation 344) an error message to the user device informing the user that the transaction cannot be processed.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the disclosure may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the DL network 100 can be implemented on one or more network devices coupled through a physical network. For example, each of the DL nodes 102A-N can be implemented on one ND or distributed over multiple NDs.

Figure 4:
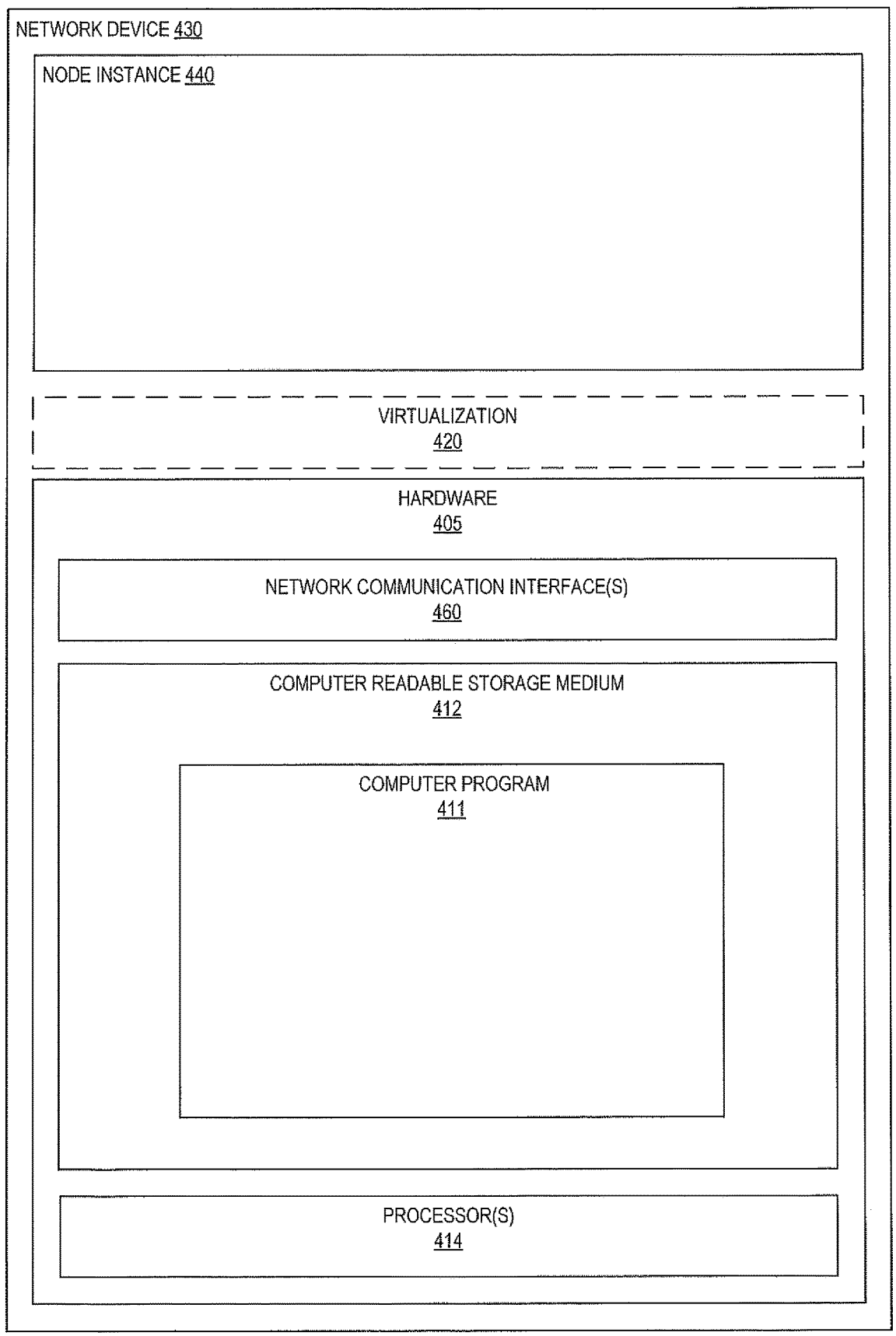
FIG. 4 illustrates a block diagram for a network device that can be used for implementing one or more of the DL nodes described herein, in accordance with some embodiments.

FIG. 4 illustrates a block diagram for a ND that can be used for implementing one or more of the DL nodes described herein, in accordance with some embodiments. According to one embodiment, the ND is an electronic device which includes hardware 405. Hardware 405 includes one or more processors 414, network communication interfaces 460 coupled with a computer readable storage medium 412. The computer readable storage medium 412 may include a computer program 411.

While one embodiment does not implement virtualization, alternative embodiments may use different forms of virtualization—represented by a virtualization layer 420. In these embodiments, the instance 440 and the hardware that executes it form a virtual server which is a software instance of the modules stored on the computer readable storage medium 412.

The computer program 411 includes instructions which when executed by the hardware 405 causes the instance 440 to perform the operations described with reference to FIGS. 1A-2D. In this embodiment, the DLT node 102A is implemented on a single network device.

Figure 5:
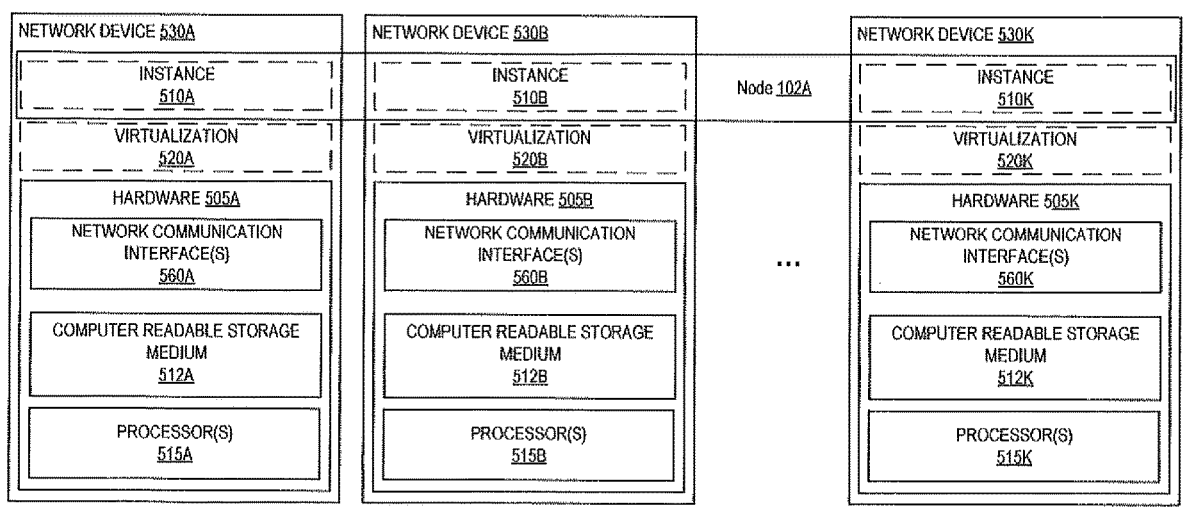
FIG. 5 illustrates a block diagram for network devices that can be used for implementing a DL node described herein, in accordance with some embodiments.

FIG. 5 illustrates an exemplary embodiment in which a node is implemented on multiple network devices. In the illustrated example, the DLT node 102A is distributed over multiple network devices 530A-530K, where each network device has a similar architecture as network device 430. The multiple network devices 530A-530K are coupled through one or more links and can be located in a same geographical location or remote from one another. The operations described with reference to the embodiments of FIGS. 1A-2D can be distributed over the multiple network devices, such as each network device is operative to perform a subset of the operations described herein.

While the flow diagrams in the figures show a particular order of operations performed by certain embodiments of the disclosure, it should be understood that such order is exemplary (e.g., alternative embodiments may perform the operations in a different order, combine certain operations, overlap certain operations, etc.).

While the disclosure has been described in terms of several embodiments, those skilled in the art will recognize that the disclosure is not limited to the embodiments described, can be practiced with modification and alteration within the spirit and scope of the appended claims. The description is thus to be regarded as illustrative instead of limiting.

What is claimed is:

1. A method of processing a transaction in a distributed ledger (DL) network, the method comprising:
   receiving, at a DL node from a user device, a request for the transaction including data;
   determining a first set of one or more DL nodes of the DL network that have characteristics that satisfy one or more policies associated with the data of the transaction by retrieving the one or more policies associated with the data from a digital ledger of the DL network and retrieving characteristics of DL nodes from the digital ledger of the DL network; and
   responsive to determining that the DL node is one of the first set of one or more DL nodes, performing the following:
      executing the transaction at the DL node; and
      inserting the transaction as a private transaction in the digital ledger of the DL network, causing a second set of one or more DL nodes of the DL network that is different from the first set of one or more DL nodes to access only an identifier of the transaction and not a payload of the transaction.

2. The method of claim 1, wherein the performing responsive to determining that the DL node is one of the first set of one or more DL nodes further includes:
   transmitting the request to at least one of the first set of one or more DL nodes.

3. The method of claim 1 further comprising:
   responsive to determining that the DL node is not one of the first set of one or more DL nodes, performing the following:
      stopping processing of the request for the transaction; and
      transmitting an error message to the user device.

4. The method of claim 1, wherein the performing responsive to determining that the DL node is one of the first set of one or more DL nodes, further includes:
   responsive to determining, based at least in part on the one or more policies associated with the data of the transaction, that a user of the user device is authorized to receive a result of execution of the transaction, transmitting a response to the user device including the result of the execution of the transaction.

5. The method of claim 1, wherein the performing responsive to determining that the DL node is one of the first set of one or more DL nodes, further includes:
responsive to determining, based at least in part on the one or more policies associated with the data of the transaction, that a user of the user device is not authorized to receive a result of execution of the transaction, transmitting a response to the user device including a confirmation that the execution of the transaction was successful.

6. The method of claim 1, wherein the request for a transaction is a request for execution of a smart contract and the data includes one or more inputs of the smart contract and one or more outputs of the smart contract.

7. The method of claim 6, wherein the determining the first set of one or more DL nodes of the DL network that have characteristics that satisfy the one or more policies associated with the data of the transaction includes:
determining, based on the one or more policies, DL nodes that are authorized to store the one or more inputs of the smart contract and the one or more outputs of the smart contract.

8. The method of claim 7, wherein the determining, based on the one or more policies, the DL nodes that are authorized to store the one or more inputs of the smart contract and the one or more outputs of the smart contract includes:
retrieving, from the digital ledger of the DL network, policies associated with the one or more inputs of the smart contract and the one or more outputs of the smart contract; and
retrieving characteristics of DL nodes from the digital ledger of the DL network.

9. The method of claim 1, wherein the executing the transaction at the DL node further includes:
storing the transaction at the DL node; or
encrypting the transaction at the DL node to obtain an encrypted transaction and storing the encrypted transaction.

10. A node in a distributed ledger network, the node comprising:
one or more processors; and
a computer readable storage medium storing instructions which, when executed by the one or more processors, cause the node to perform operations to:
receive, at a DL node from a user device, a request for a transaction including data;
determine a first set of one or more DL nodes of the DL network that have characteristics that satisfy one or more policies associated with the data of the transaction by retrieval of the one or more policies associated with the data from a digital ledger of the DL network and retrieval of characteristics of DL nodes from the digital ledger of the DL network; and
responsive to a determination that the DL node is one of the first set of one or more DL nodes, perform the following to:
execute the transaction at the DL node; and
insert the transaction as a private transaction in the digital ledger of the DL network to cause a second set of one or more DL nodes of the DL network that is different from the first set of one or more DL nodes to access only an identifier of the transaction and not a payload of the transaction.

11. The node of claim 10, wherein to perform responsive to the determination that the DL node is one of the first set of one or more DL nodes further includes:
transmit the request to at least one of the first set of one or more DL nodes.

12. The node of claim 10, wherein the operations further include:
responsive to a determination that the DL node is not one of the first set of one or more DL nodes, perform the following to:
stop processing of the request for the transaction; and
transmit an error message to the user device.

13. The node of claim 10, wherein to perform responsive to the determination that the DL node is one of the first set of one or more DL nodes, further includes:
responsive to a determination, based at least in part on the one or more policies associated with the data of the transaction, that a user of the user device is authorized to receive a result of execution of the transaction, transmit a response to the user device including the result of the execution of the transaction.

14. The node of claim 10, wherein to perform responsive to the determination that the DL node is one of the first set of one or more DL nodes, further includes:
responsive to a determination, based at least in part on the one or more policies associated with the data of the transaction, that a user of the user device is not authorized to receive a result of execution of the transaction, transmit a response to the user device including a confirmation that the execution of the transaction was successful.

15. The node of claim 10, wherein the request for the transaction is a request for execution of a smart contract and the data includes one or more inputs of the smart contract and one or more outputs of the smart contract.

16. The node of claim 15, wherein the determination of the first set of one or more DL nodes of the DL network that have characteristics that satisfy the one or more policies associated with the data of the transaction includes:
determine, based on the one or more policies, DL nodes that are authorized to store the one or more inputs of the smart contract and the one or more outputs of the smart contract.

17. The node of claim 16, wherein the determination, based on the one or more policies, the DL nodes that are authorized to store the one or more inputs of the smart contract and the one or more outputs of the smart contract includes:
retrieve, from the digital ledger of the DL network, policies associated with the one or more inputs of the smart contract and the one or more outputs of the smart contract; and
retrieve characteristics of DL nodes from the digital ledger of the DL network.

18. The node of claim 10, wherein execution of the transaction at the DL node further includes to:
store the transaction at the DL node; or
encrypt the transaction at the DL node to obtain an encrypted transaction and store the encrypted transaction.

* * * * *